Patented Mar. 31, 1953

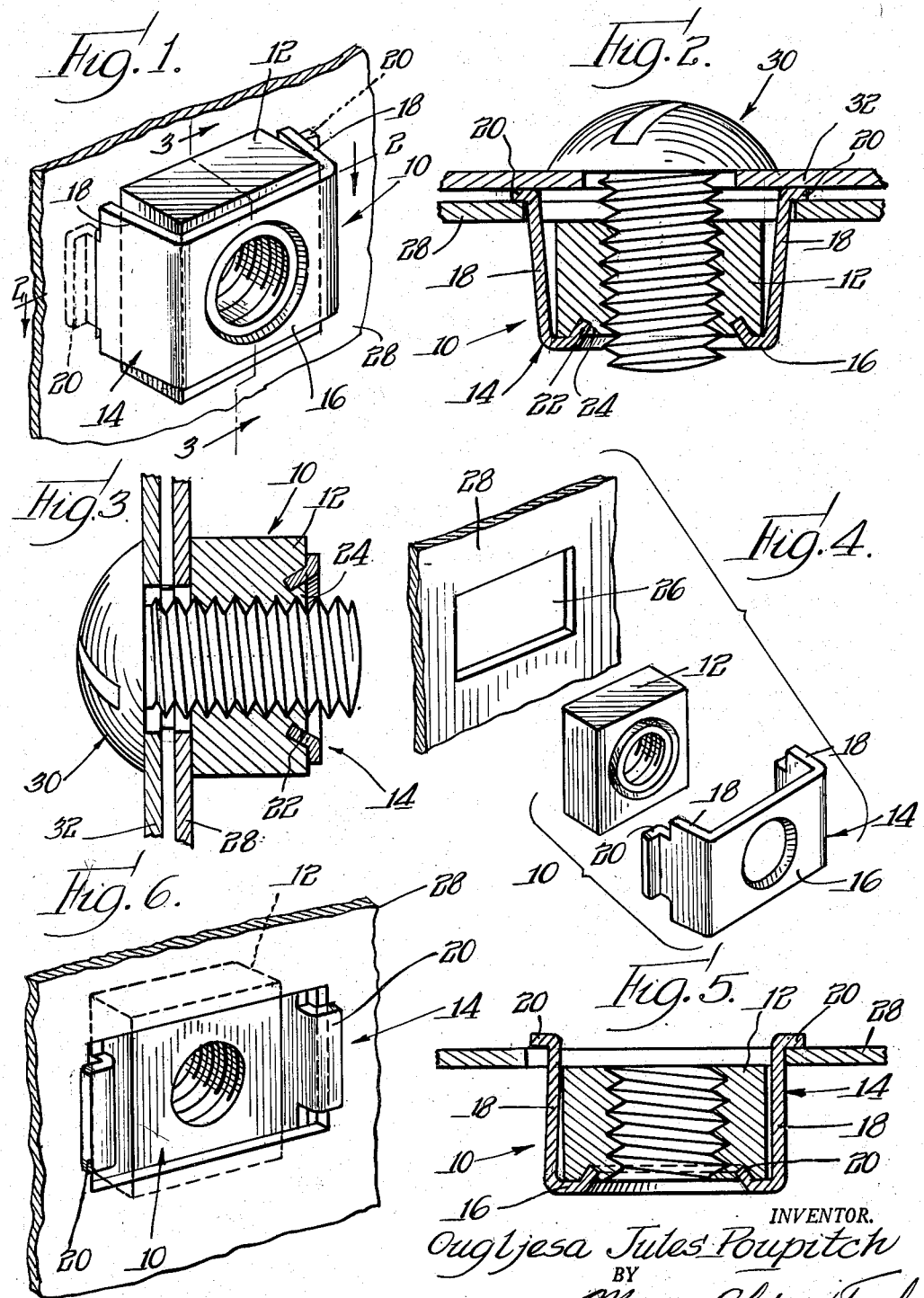

2,633,174

UNITED STATES PATENT OFFICE 2,633,174

NUT CAGE

Ougljesa Jules Poupitch, Chicago, Ill., assignor to Illinois Tool Works, Chicago, Ill., a corporation of Illinois Application March 9, 1950, Serial No. 148,556

3 Claims. (Cl. 151—41.75)

This invention relates generally to nut cages, and more particularly to nut cages of the type adapted to be applied to an apertured work piece by flexing a sheet metal cage member sufficiently to permit insertion within the work aperture.

It has been common practice to house nuts within sheet metal members, the sheet metal member serving as the instrumentality for securing the nut in screw accommodating position upon an apertured work piece. The present invention, however, contemplates a new and practical preassembled fastener unit in which the nut is carried by a sheet metal retainer or cage member and in which the nut is adapted to bear directly against the work surface after the unit has been attached within a work aperture.

More specifically, the present invention contemplates a preassembled nut and retainer member of the type set forth above, wherein the retainer member is secured to the nut on the side oppositely disposed from the clamping side of the nut, and oppositely disposed resilient sections of the retainer may be flexed to permit insertion and subsequent attachment within the aperture of a work sheet.

The present invention lends itself particularly in instances where a rectangular opening is provided in the work sheet, and after the retainer member has been attached to the work piece at opposite extremities of the elongated work aperture, the clamping surface of the nut carried as a unit by the retainer member will bear directly against the work surface adjacent opposite sides of the work aperture.

Still more specifically it is proposed to provide a nut and cage assembly or fastener unit, as referred to above, in which the sheet metal retainer member is secured to the side of the nut oppositely disposed from the clamping side thereof by annular overlapping abutment surfaces which prevent axial separation of the parts.

The foregoing and other objects and advantages will be more apparent from the following detailed description when considered in connection with the accompanying drawing, wherein—

Fig. 1 is a perspective view of a preassembled nut and sheet metal retainer member constructed in accordance with the teachings of the present invention, secured within an aperture of a work sheet;

Fig. 2 is a transverse sectional view taken substantially along the line 2—2 of Fig. 1, showing a screw member applied to the nut with the head thereof tightened against a second work piece;

Fig. 3 is a transverse sectional view taken substantially along the line 3—3 of Fig. 1;

Fig. 4 is an exploded view more clearly to illustrate the nut member and retainer member which constitute the fastener unit and the apertured work sheet;

Fig. 5 is a view similar to Fig. 2, illustrating the manner in which one of the side walls or flanges of the retainer member is pressed inwardly toward the nut body in order to permit telescopic association with the aperture of the work piece; and Fig. 6 is a perspective view as seen from the rear of the structure illustrated in Fig. 1.

Referring now to the drawing, wherein like numerals have been employed to designate similar parts throughout the various figures, it will be seen that a preassembled nut and retainer member is designated generally by the numeral 10. This preassembly or fastener unit includes a nut member 12 preassembled with a sheet metal nut retainer or cage member designated generally by the numeral 14. The nut retainer 14 includes a plate or body section 16 which is adapted to transversely overlie the face of the nut 12 oppositely disposed from the clamping side thereof. Flange or wall sections 18 extend normal to and are formed integral with the plate 16 and overlie oppositely disposed peripheral elongated sides of the nut 12. A retainer foot or flange 20 extends laterally from the free margin of each wall section 14.

Particular attention is directed to the manner in which the nut 12 is permanently secured to the retainer plate 16. It will be noted that the retainer plate 16 is centrally apertured and is formed with an annular inwardly inclined flange 22. During initial assembly of the retainer member 14 with the nut 12, this annular flange 22 is inserted within a complementary annular recess in the nut. Subsequently the portion of the nut stock positioned adjacently inwardly from the flange 22 is swaged or upset so as to provide a retaining shoulder 24.

It will also be noted that sufficient space is presented between the wall sections 18 and the adjacent peripheral surface of the nut 12 to permit inward flexing of these wall sections (Fig. 5) sufficiently to permit insertion of the retainer feet 20 into an aperture 26 of a work piece 28. After the feet 20 have cleared the inner surface of the work sheet 28, pressure on the wall sections 18 is released, and the feet automatically spring into adjacent overlying relation with the surface portions of the work in the vicinity of the narrower extremities of the aperture 26. Obviously, the dimension of the nut 12 must be such that after the unit has been applied to the work sheet 28 the nut will directly overlie portions of the surface of the work sheet adjacent the elongated margins of the aperture 26, as clearly illustrated in Figs. 1 and 6. In this position the nut overlies the work piece on one side and the retainer feet or flanges 20 on the the other side, thus securing the fastener unit against unauthorized dislodgement. To remove the fastener unit from the work aperture, it is only necessary to flex the wall sections 18 inwardly, as clearly illustrated in Fig. 5. When the fastener unit is attached to the work piece 28 within the aperture 26, it is in position to accommodate a fastening screw designated generally by the numeral 30, Figs. 2 and 3. In the disclosed applications, the head of the screw member 30 clampingly engages a second work piece 32, and thereby holds this work piece 32 in proper attached position upon the work piece 28.

From the foregoing it will be apparent that the present invention contemplates a fastener unit of extremely simple and practical construction, wherein the nut member is adapted to directly engage the surface of the work sheet to which it is attached. This is made possible by the manner in which the nut is secured to the retainer member 14. That is to say, by providing attaching or coupling means on the side of the nut oppositely disposed from the clamping side thereof, said clamping side is free for direct engagement with the surface of the work piece 28. Such attachment also facilitates freeing the opposed side or wall sections 18 of the retainer member so as to render them readily flexible for attachment and detachment of the fastener unit with respect to the work sheet. Also, by providing means for permanently attaching the retainer plate to the nut consisting of a flange which extends out of the plane of the plate toward the clamping surface of the nut into a complementary annular recess in the nut, the attachment is accomplished without projecting any of the attaching structure beyond the outer surface of the nut body. This makes for neat appearance and renders the device more generally applicable for use.

Obviously the invention is not limited to the specific structural details illustrated herein, but is capable of other modifications and changes coming within the scope of the appended claims.

The invention is hereby claimed as follows:

1. A fastener unit including a nut member having opposed planar side walls substantially parallel to the nut axis, a sheet metal retainer member therefor consisting of a strip of sheet metal bent intermediate its ends to form a plate section engaging the top surface of the nut and a pair of relatively rigid substantially straight arms extending outwardly from and having a resilient hinge connection with opposite margins of said plate section adjacent opposite sides of the nut and diverging relative to each other in a direction away from said plate section and nut, each of said arms having a lateral outwardly extending flange at the free extremity, said relatively rigid arms extending beyond the clamping surface of the nut a distance not greater than one-half the overall thickness of the nut member, the lateral extent of at least one flange being not greater than the extent of divergence of said arms measured in a plane coincident with the clamping surface of said nut member, and means directly securing the plate to the top surface of the nut member against lateral and axial separation.

2. A fastener unit of the type described in claim 1, wherein said arms are abruptly reduced in width in the vicinity of said flange portions to provide shoulders along the margins of the strip for cooperating with said flanges to embrace a work piece therebetween.

3. A fastener unit of the type described in claim 1, wherein said sheet metal retainer member is comprised of a strip of sheet material of uniform width, said strip along its length being no greater in width than the width of said nut member.

OUGLJESA JULES POUPITCH.

REFERENCES CITED

The following references are of record in the file of this patent:

UNITED STATES PATENTS

| Number | Name | Date |
|---|---|---|
| 638,564 | Davies | Dec. 5, 1899 |
| 1,046,914 | Webb | Dec. 10, 1912 |
| 1,315,160 | Ross | Sept. 2, 1919 |
| 1,800,176 | Carr | Apr. 7, 1931 |
| 1,805,460 | Carr | May 12, 1931 |
| 1,924,695 | Olson | Aug. 29, 1933 |
| 2,255,649 | Burke | Sept. 9, 1941 |
| 2,283,122 | Murphy | May 12, 1942 |
| 2,326,285 | Burke | Aug. 10, 1943 |
| 2,391,046 | Tinnerman | Dec. 18, 1945 |

FOREIGN PATENTS

| Number | Country | Date |
|---|---|---|
| 556,544 | Great Britain | Oct. 8, 1943 |